United States Patent Office 2,945,868
Patented July 19, 1960

2,945,868

2,3,17-TRIHYDROXYESTRA-1,3,5(10)-TRIENE ETHERS AND ESTERS

Willard M. Hoehn, Wilmette, Ill., assignor to G. D. Searle & Co., Chicago, Ill., a corporation of Delaware No Drawing. Filed Mar. 5, 1959, Ser. No. 797,327

9 Claims. (Cl. 260—397.5)

The present invention relates to certain steroidal ethers and esters and more particularly to 2,3,17-trihydroxy-estra-1,3,5(10)-triene ethers and esters. The compounds of this invention are represented by the structural formula

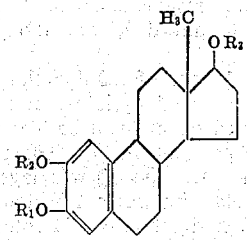

wherein $R_1$ is selected from the group consisting of lower alkyl and benzyl radicals, $R_2$ is selected from the group consisting of lower alkyl and lower alkanoyl radicals, and $R_3$ is a lower alkanoyl radical. The radicals which are represented by "lower alkyl" are, for example, methyl, ethyl, propyl, butyl, amyl, hexyl, heptyl, octyl, and the branched-chain isomers thereof. The term "lower alkanoyl" comprises the radicals exemplified by formyl, acetyl, propionyl, butyryl, valeryl, caproyl, enanthyl, caprylyl, and the branched-chain isomers thereof.

Suitable starting materials for the preparation of the compounds of this invention are the lower alkyl and benzyl ethers of 2-acetyl-3-hydroxy-17β-(lower alkanoyl-oxy)estra-1,3,5(10)-trienes. The preparation of these ethers is described in U.S. Patent 2,846,453.

The 2-acetoxy-17β-(lower alkanoyloxy)-3-(lower alkoxy)estra-1,3,5(10)-trienes of this invention can be manufactured by treating the aforementioned 2-acetyl-17β-(lower alkanoyloxy)-3-(lower alkoxy)estra-1,3,5 (10)-trienes in benzene with perbenzoic acid. As a specific example, 17β-acetoxy-2-acetyl-3-methoxyestra-1,3,5 (10)-triene is treated with perbenzoic acid in benzene to yield 2,17β-diacetoxy-3-methoxyestra-1,3,5(10)-triene.

The 2-acetoxy-3-benzyloxy-17β-(lower alkanoyloxy)es-tra-1,3,5(10)-trienes of the present invention can be prepared by reacting the aforementioned 2-acetyl-3-benzyl-oxy-17β-(lower alkanoyloxy)estra-1,3,5(10)-trienes with perbenzoic acid in benzene. For example, 17β-acetoxy-2-acetyl-3-benzyloxyestra-1,3,5(10)-triene is reacted with a benzene solution of perbenzoic acid to afford 3-benzyl-oxy-2,17β-diacetoxyestra-1,3,5(10)-triene.

The 3-benzyloxy-2-(lower alkoxy) compounds of this invention can be prepared from the aforementioned 2-acetoxy-3-benzyloxy-17β-(lower alkanoyloxy)estra-1,3,5 (10)-trienes. Treating the latter with a di-(lower alkyl) sulfate and sodium hydroxide results in 3-benzyloxy-2-(lower alkoxy)estra-1,3,5(10)-trien-17β-ols. By treating the latter compounds in pyridine with an appropriate alkanoic acid anhydride, the 3-benzyloxy-17β-(lower alkanoyloxy)-2-(lower alkoxy)estra-1,3,5(10)-trienes of the present invention are obtained. As a specific example, 3 - benzyloxy - 2,17β - diacetoxyestra - 1,3,5(10) - triene is treated with dimethyl sulfate and sodium hydroxide to afford 3-benzyloxy-2-methoxyestra-1,3,5(10)-trien-17β-ol.

Treatment of the latter compound in pyridine with acetic anhydride results in 17β-acetoxy-3-benzyloxy-2-methoxy-estra-1,3,5(10)-triene.

By a process similar to that described supra, the 2,3-dialkoxy-17β-(lower alkanoyloxy)estra-1,3,5(10)-trienes of this invention can be prepared. In this case, the 2-acetoxy-17β-(lower alkanoyloxy)-3-(lower alkoxy)estra-1,3,5(10)-trienes of this invention are treated with a di-(lower alkyl) sulfate and sodium hydroxide to afford the corresponding 2,3-dialkoxyestra-1,3,5(10)-triene-17β-ols. The latter compounds are treated with pyridine and an alkanoic acid anhydride to yield the instant 2,3-dialkoxy-17β-(lower alkanoyloxy)estra-1,3,5(10)-trienes. For example, 2,17β-diacetoxy-3-methoxyestra-1,3,5(10)-triene is reacted with sodium hydroxide and dimethyl sulfate, resulting in 2,3-dimethoxyestra-1,3,5(10)-trien-17β-ol. The latter substance is treated in pyridine with acetic anhydride to yield 17β-acetoxy-2,3-dimethoxyestra-1,3,5(10)-triene.

The compounds of this invention are useful as a result of their valuable pharmacological properties. They exhibit selective anti-cortisone activity for upon administration with cortisone they inhibit its ability to promote a Coxsackie virus infection.

The invention will appear more fully from the examples which follow. These examples are set forth by way of illustration only and it will be understood that the invention is not to be construed as limited in spirit or in scope by the details contained therein as many modifications in materials and methods will be apparent in this disclosure to those skilled in the art. In these examples temperatures are given in degrees centigrade (° C.). Quantities of materials are expressed in parts by weight unless otherwise noted.

EXAMPLE 1

*2-acetyl-3-butoxy-17β-valeryloxyestra-1,3,5(10)-triene*

A solution of 5 parts of 17β-acetoxy-2-acetyl-3-hydroxy-estra-1,3,5(10)-triene in 300 parts of methanol is mixed with 200 parts of 20% aqueous sodium hydroxide and 250 parts of dibutyl sulfate. The resultant mixture is stirred at room temperature for eight hours, made alkaline with dilute sodium hydroxide solution, and extracted with ether. The ether layer is washed with water, dried over anhydrous sodium sulfate, and evaporated to dryness in vacuo. The residue is crystallized from an ether-hexane solution to afford 2-acetyl-3-butoxyestra-1,3,5(10)-trien-17β-ol.

A mixture of 1 part of 2-acetyl-3-butoxyestra-1,3,5 (10)-trien-17β-ol, 50 parts of pyridine and 75 parts of valeric anhydride is heated on a steam bath for 16 hours. The reaction mixture is poured into 250 parts of water, then the resultant mixture extracted with ether. The ether solution is washed successively with water, dilute aqueous sodium hydroxide, and dilute hydrochloric acid; dried over anhydrous sodium sulfate and evaporated to dryness in vacuo. Recrystallization of the residue from an ether-hexane solution yields 2-acetyl-3-butoxy-17β-valeryloxyestra-1,3,5(10)-triene, which exhibits maxima in the ultra-violet at 258 and 317 millimicrons with extinction coefficients of 8700 and 3600, respectively. Its infra-red spectrum possesses maxima at 5.78, 6.02, 6.70, 8.00, 8.37, 9.78 and 11.95 microns.

EXAMPLE 2

*2,17β-diacetoxy-3-methoxyestra-1,3,5(10)-triene*

To an ice-cold solution of 2 parts of 17β-acetoxy-2-ace-tyl-3-methoxyestra-1,3,5(10)-triene in 90 parts of benzene is added 90 parts of a 0.4 Normal solution of perbenzoic acid in benzene. The mixture is allowed to stand at room temperature in the dark for 3 days, then diluted with ether. The ether solution is washed successively with 2% aqueous sodium hydroxide and water, dried over anhydrous sodium sulfate, and evaporated to dryness in vacuo. The gummy residue is dissolved in a benzene-Skellysolve A mixture and the solution passed through a silica gel chromatographic column. Elution of the column with a 2% ethyl acetate in benzene solution yields the crude product. Recrystallization of the crude material from an ether-petroleum ether solution affords 2,17β-diacetoxy-3-methoxyestra-1,3,5(10)-triene, M.P. 131–132.5°.

By substituting 2-acetyl-3-butoxy-17β-valeryloxyestra-1,3,5(10)-triene and proceeding according to the herein described process, 2-acetoxy-3-butoxy-17β-valeryloxyestra-1,3,5(10)-triene is obtained.

EXAMPLE 3

*3-benzyloxy-2,17β-diacetoxyestra-1,3,5(10)-triene*

To an ice-cold solution of 5 parts of 17β-acetoxy-2-acetyl-3-benzyloxyestra-1,3,5(10)-triene in 90 parts of benzene is added a solution of 3.26 parts of perbenzoic acid in 110 parts of benzene. The resultant solution is allowed to stand at room temperature for three days, then treated with 200 parts of 5% aqueous sodium hydroxide and 140 parts of ether. The mixture is shaken in a separatory funnel, the organic layer separated and washed successively with 5% aqueous sodium hydroxide and water. The ether solution is dried over anhydrous sodium sulfate, then concentrated to dryness under reduced pressure. The crystalline residue is recrystallized first from aqueous methanol, then from methanol to afford 3-benzyloxy-2,17β-diacetoxyestra-1,3,5(10)-triene, M.P. 146–148°; $[\alpha]_D = +32.5°$ (1% in chloroform).

By substituting 2-acetyl-3-benzyloxy-17β-butyroxyestra-1,3,5(10)-triene and proceeding according to the herein described process, 2-acetoxy-3-benzyloxy-17β-butyroxyestra-1,3,5(10)-triene is obtained.

EXAMPLE 4

*3-benzyloxy-2-methoxyestra-1,3,5(10)-trien-17β-ol*

To a solution of 7 parts of 3-benzyloxy-2,17β-diacetoxyestra-1,3,5(10)-triene in 400 parts of methanol is added alternately, in small portions, 250 parts of 20% aqueous sodium hydroxide and 270 parts of dimethyl sulfate. The reaction mixture is made alkaline by the addition of dilute aqueous sodium hydroxide, and the resultant solution extracted with ether. The organic layer is washed with water, dried over anhydrous sodium sulfate, and evaporated to dryness in vacuo. Crystallization of the residue from an ether-hexane solution yields 3-benzyloxy-2-methoxyestra-1,3,5(10)-trien-17β-ol which absorbs in the ultra-violet region at 280 and 286 millimicrons with extinction coefficients of 3150 and 2900, respectively. Its infrared absorption spectrum possesses maxima at 2.79, 6.18, 6.62, 7.98, 9.56 and 9.70 microns.

By substituting dibutyl sulfate and proceeding according to the herein described process, 3-benzyloxy-2-butoxyestra-1,3,5(10)-trien-17β-ol is obtained.

EXAMPLE 5

*17β-acetoxy-3-benzyloxy-2-methoxyestra-1,3,5(10)-triene*

A mixture of 5 parts of 3-benzyloxy-2-methoxyestra-1,3,5(10)-trien-17β-ol with 200 parts of pyridine and 210 parts of acetic anhydride is heated on a steam bath for 16 hours. The reaction mixture is poured into 1000 parts of water and the resultant mixture extracted with ether. The ether solution is washed successively with water, 2% aqueous sodium hydroxide, and 2% hydrochloric acid solution; dried over anhydrous sodium sulfate and concentrated to dryness under reduced pressure. The residual solid is crystallized from an ether-hexane solution to yield 17β-acetoxy-3-benzyloxy-2-methoxyestra-1,3,5(10)-triene. The ultraviolet absorption spectrum of this compound contains maxima at 280.5 and 286.5 millimicrons with extinction coefficients of 2950 and 2800, respectively; while its infrared absorption spectrum possesses maxima at 5.76, 6.18, 6.62, 7.30, 8.01 and 9.72 microns.

By substituting 3-benzyloxy-2-butoxyestra-1,3,5(10)-trien-17β-ol and valeric anhydride and otherwise proceeding according to the herein described process, 3-benzyloxy-2-butoxy-17β-valeryloxyestra-1,3,5(10)-triene is obtained.

EXAMPLE 6

*17β-acetoxy-2,3-dimethoxyestra-1,3,5(10)-triene*

A solution of 5 parts of 2,17β-diacetoxy-3-methoxyestra-1,3,5(10)-triene in 400 parts of methanol is stirred at room temperature while 180 parts of 20% aqueous sodium hydroxide and 200 parts of dimethyl sulfate are added. Stirring is continued for 30 minutes, then the mixture made alkaline and extracted with ether. The ether layer is washed with water, dried over anhydrous sodium sulfate and the solvent removed under reduced pressure. The solid residue is crystallized from an ether-hexane solution to afford 2,3-dimethoxyestra-1,3,5(10)-trien-17β-ol.

A mixture of 1 part of 2,3-dimethoxyestra-1,3,5(10)trien-17β-ol, 40 parts of pyridine, and 42 parts acetic anhydride is heated on a steam bath for 16 hours, then poured into 150 parts of water. The resultant mixture is extracted with ether; the organic layer separated and washed successively with water, 2% aqueous sodium hydroxide, and 2% hydrochloric acid solution. The ether solution is dried over anhydrous sodium sulfate and the solvent evaporated under reduced pressure. Recrystallization of the residue from an ether-hexane solution yields 17β - acetoxy-2,3-dimethoxyestra-1,3,5(10)-triene. This compound possesses maxima in the ultra-violet at 280 and 286 millimicrons with extinction coefficients of 3100 and 2700, respectively; and also, maxima in the infra-red at 5.76, 6.18, 6.63, 7.30, 8.00 and 9.70 microns.

By substituting dibutyl sulfate and otherwise proceeding according to the herein described processes, 17β-acetoxy-2-butoxy-3-methoxyestra-1,3,5(10)-triene is obtained.

What is claimed is:

1. A compound of the structural formula:

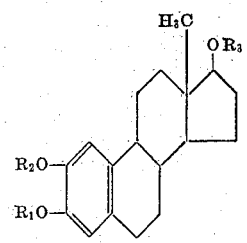

wherein $R_1$ is a member of the group consisting of lower alkyl and benzyl radicals, $R_2$ is selected from the group consisting of lower alkyl and lower alkanoyl radicals, and $R_3$ is a lower alkanoyl radical.

2. A compound of the structural formula

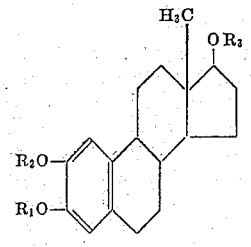

wherein $R_1$ is a lower alkyl radical, $R_2$ is an acetyl radical, and $R_3$ is a lower alkanoyl radical.

3. 2,17β-diacetoxy-3-methoxyestra-1,3,5(10)-triene.

4. A compound of the structural formula

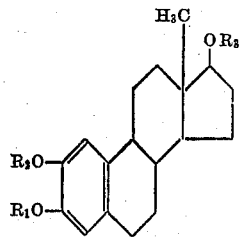

wherein $R_1$ is a benzyl radical, $R_2$ is a lower alkyl radical, and $R_3$ is a lower alkanoyl radical.

5. 17β-acetoxy-3-benzyloxy-2-methoxyestra-1,3,5(10)-triene.

6. A compound of the structural formula

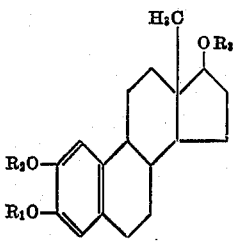

wherein $R_1$ is a benzyl radical, $R_2$ is an acetyl radical, and $R_3$ is a lower alkanoyl radical.

7. 3-benzyloxy-2,17β-diacetoxyestra-1,3,5(10)-triene.

8. A compound of the structural formula

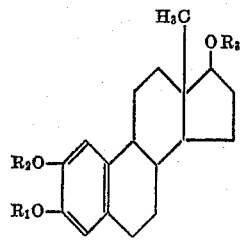

wherein $R_1$ and $R_2$ are lower alkyl radicals and $R_3$ is a lower alkanoyl radical.

9. 17β-acetoxy-2,3-dimethoxyestra-1,3,5(10)-triene.

References Cited in the file of this patent

UNITED STATES PATENTS 2,846,453    Hoehn  ---------------- Aug. 5, 1958

OTHER REFERENCES

Fishman: J.A.C.S., vol. 80, pages 1213–16 (1958).